(12) United States Patent
Bejarano Bernal

(10) Patent No.: US 11,910,765 B2
(45) Date of Patent: Feb. 27, 2024

(54) FOLDABLE POT WITH REMOVABLE HOOK FOR THE CONFIGURATION OF VERTICAL GARDENS

(71) Applicant: Jose Carlos Bejarano Bernal, Lima (PE)

(72) Inventor: Jose Carlos Bejarano Bernal, Lima (PE)

( * ) Notice: Subject to any disclaimer, the term of this patent is extended or adjusted under 35 U.S.C. 154(b) by 279 days.

(21) Appl. No.: 17/610,716

(22) PCT Filed: May 15, 2020

(86) PCT No.: PCT/PE2020/000004
§ 371 (c)(1),
(2) Date: Nov. 12, 2021

(87) PCT Pub. No.: WO2020/231278
PCT Pub. Date: Nov. 19, 2020

(65) Prior Publication Data
US 2022/0217915 A1 Jul. 14, 2022

(30) Foreign Application Priority Data
May 15, 2019 (PE) .......... 001003-2019/DIN

(51) Int. Cl.
*A01G 9/02* (2018.01)
*B65D 6/00* (2006.01)
*B65D 85/52* (2006.01)

(52) U.S. Cl.
CPC ............ *A01G 9/026* (2013.01); *A01G 9/022* (2013.01); *B65D 11/00* (2013.01); *B65D 85/52* (2013.01)

(58) Field of Classification Search
CPC .......... B65D 11/00; B65D 85/52; B65D 5/18; B65D 5/241; B65D 5/36; A01G 9/026;
(Continued)

(56) References Cited

U.S. PATENT DOCUMENTS 2,827,217 A * 3/1958 Clement ................ A47G 7/085
47/65.5
5,005,760 A * 4/1991 van den Hoogen ... A47G 7/085
428/101
(Continued)

*Primary Examiner* — Christopher R Demeree
(74) *Attorney, Agent, or Firm* — Hoglund & Pamias, PSC; Roberto J. Rios

(57) ABSTRACT

Foldable plant pot with removable hooking for the configuration of vertical gardens that is manufactured from a foldable flat square structure manipulated by folds and cuts to obtain a conical reservoir with angular shapes. It has a hooking system that allows them to be suspended in vertical structures, preferably of the mesh type, thanks to the pressure generated by the folds of the material and which also allow it to come off when this pressure is reduced so that it can be placed elsewhere. When the plant is moved, it is not affected as its root remains intact in the conical reservoir and the stem is secured by a support ring which prevents it from dropping in the event of sudden movements. In the same way, it has containment flaps that partially close the conical reservoir and prevent the substrate from being extracted by external agents such as sudden movements, winds, birds, etc. As a whole, it is possible to work with vertical garden designs considering the plants as pixel units in order to create figures, letters, logos, etc. It is a very clean system that does not require prepared soil (clay, sand, etc.) and uses little water. The irrigation system only requires a hose with drippers at the top that distribute the water to vertical rows of the plant pot.

19 Claims, 13 Drawing Sheets

(58) Field of Classification Search
CPC ...... A01G 9/9022; A47G 7/06; B31B 70/266; B65B 25/026; B65B 25/02
USPC ....... 229/108.1, 114, 116.1, 117.01; 47/65.5, 47/74; 206/423
See application file for complete search history.

(56) References Cited

U.S. PATENT DOCUMENTS

| | | | | |
|---|---|---|---|---|
| 5,752,649 | A * | 5/1998 | Weder | B65D 5/36 47/72 |
| 6,182,395 | B1 * | 2/2001 | Weder | B65D 81/36 47/72 |
| 6,595,409 | B2 * | 7/2003 | Hashimoto | B65D 5/2047 493/158 |
| 8,887,983 | B2 * | 11/2014 | Kaltman | B65D 5/563 229/175 |
| 11,230,403 | B2 * | 1/2022 | Valencia | B65D 5/46096 |
| 11,767,145 | B2 * | 9/2023 | Fernandes De Carvalho | B65D 71/70 426/108 |
| 2012/0292378 | A1 * | 11/2012 | Smith | B65D 5/46024 229/114 |
| 2021/0076575 | A1 * | 3/2021 | Farchione | A01G 9/021 |

* cited by examiner

FIGURE N°1
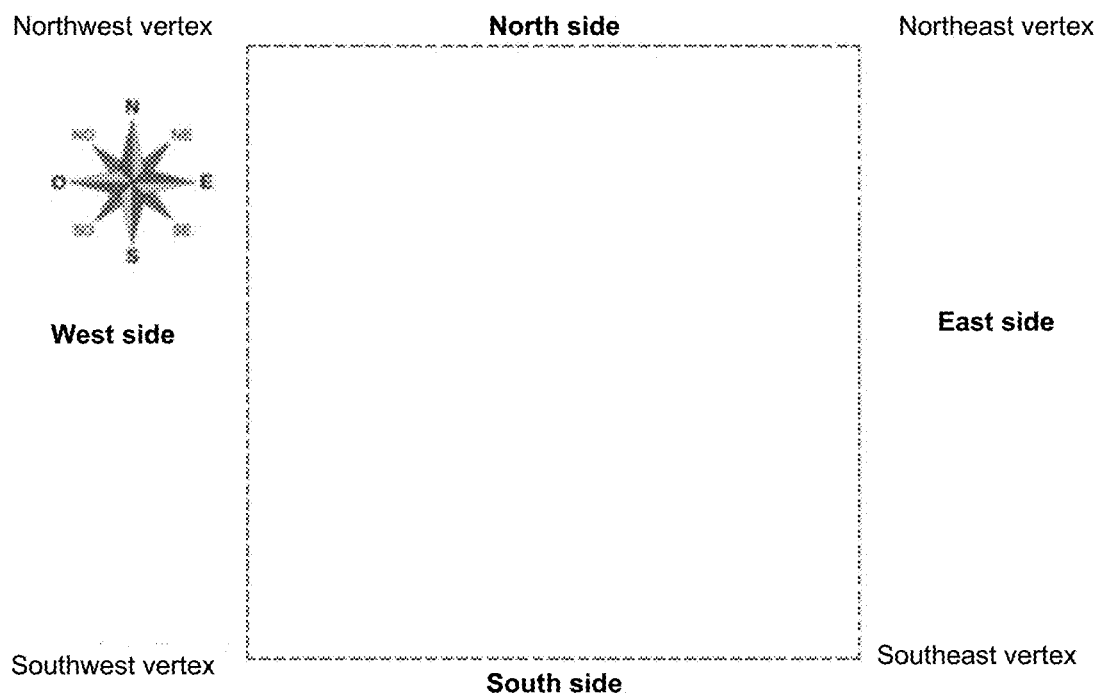
FIGURE N°2
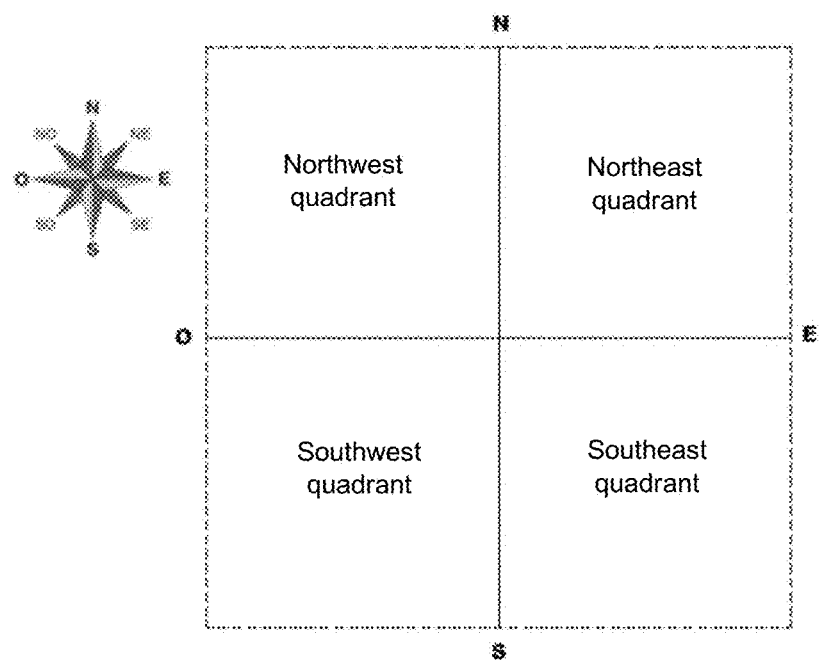

FIGURE N°3
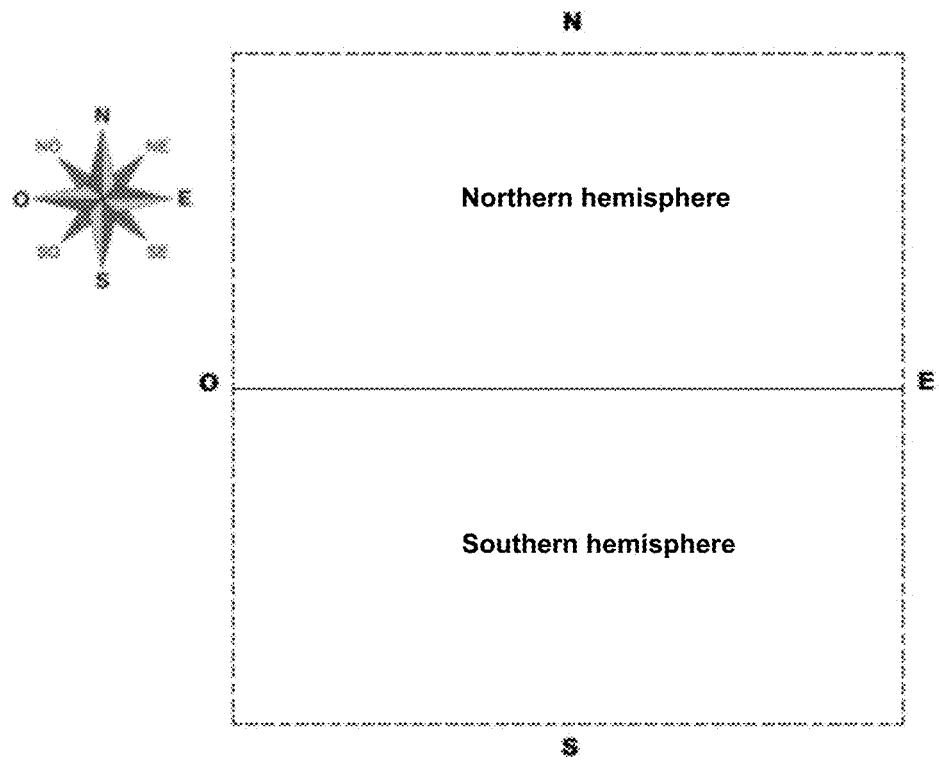
FIGURE N°4
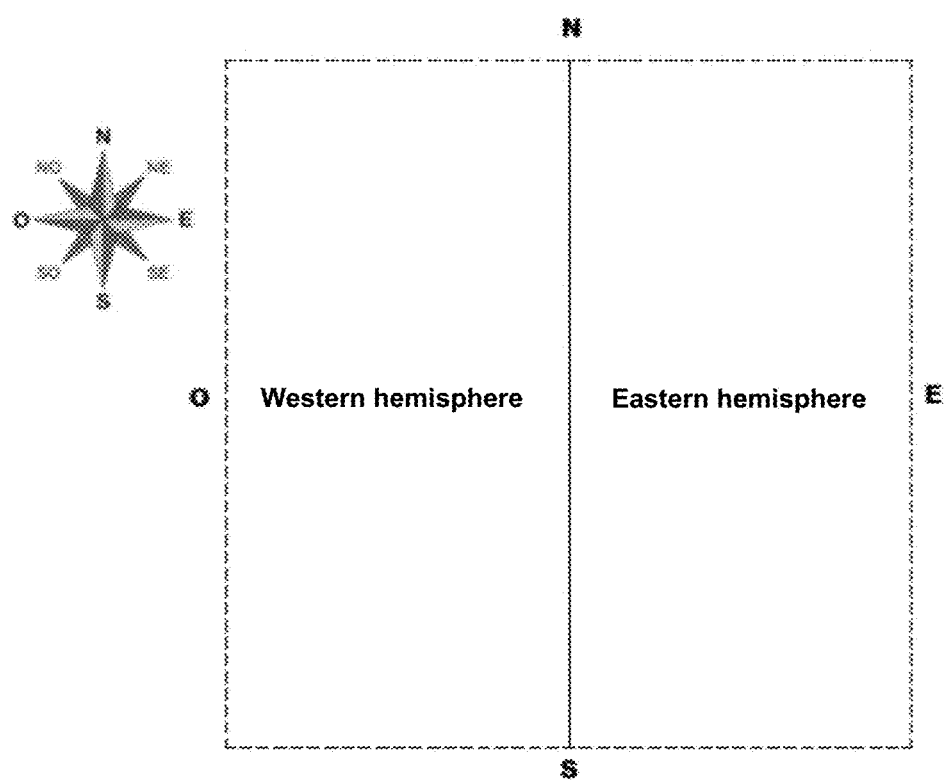

FIGURE N°5
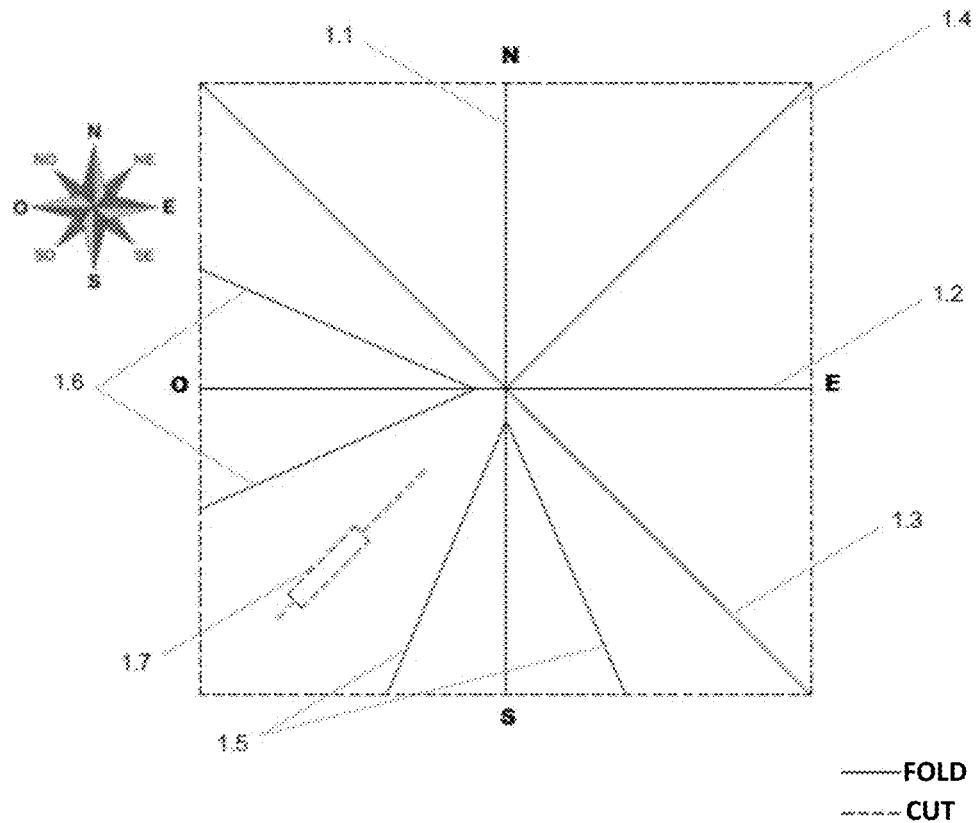
—— FOLD
---- CUT
FIGURE N°6.1
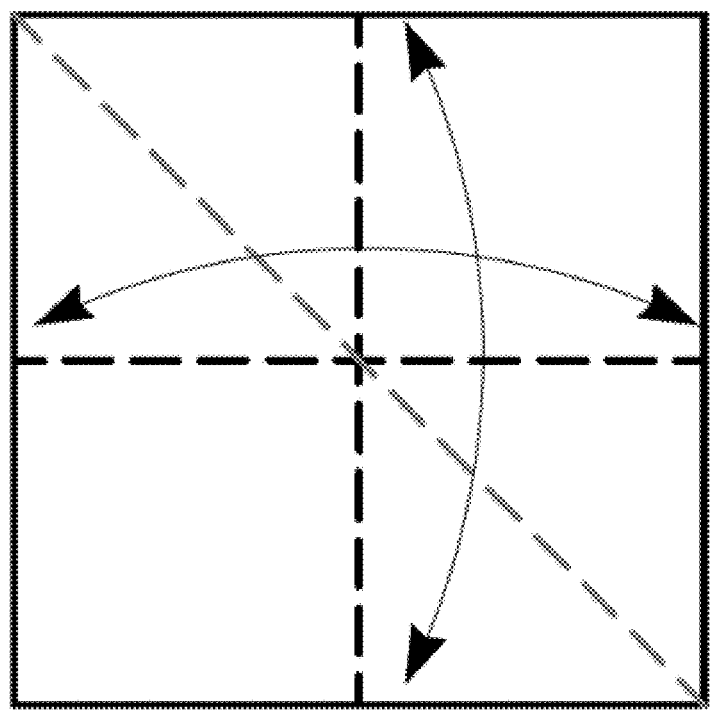

FIGURE N°6.2
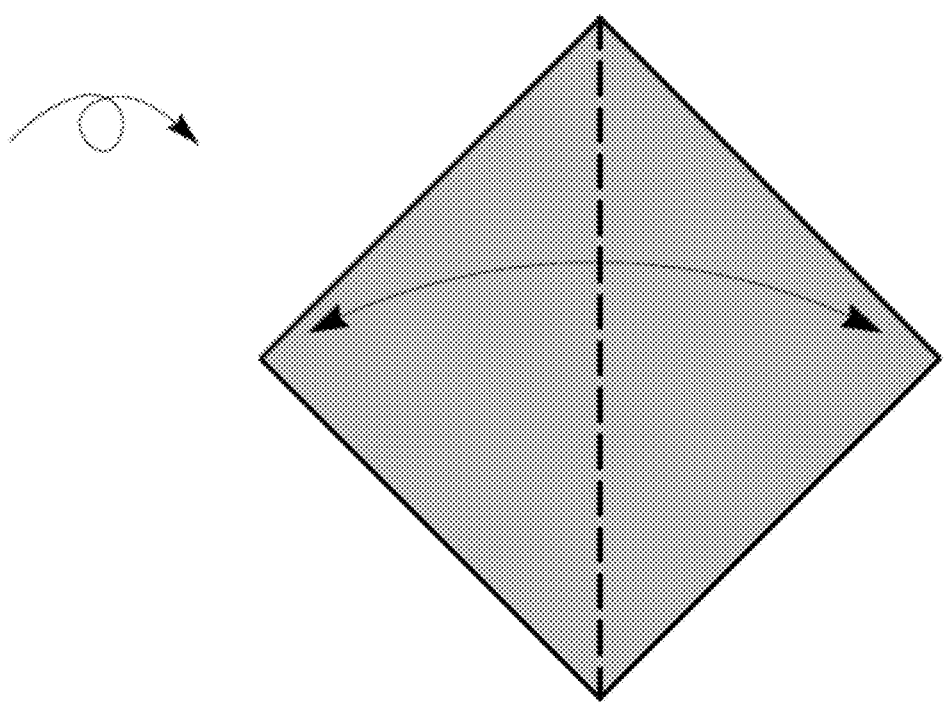
FIGURE N°6.3
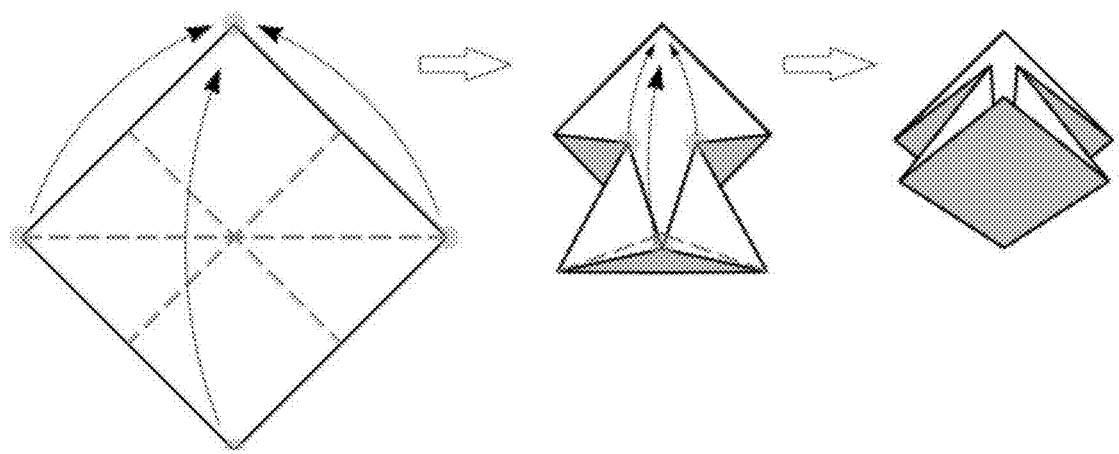

FIGURE N°6.4
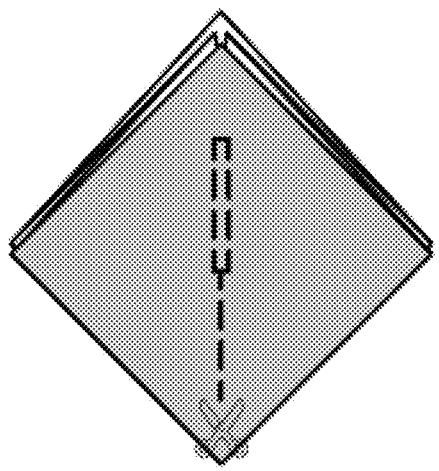
FIGURE N°6.5
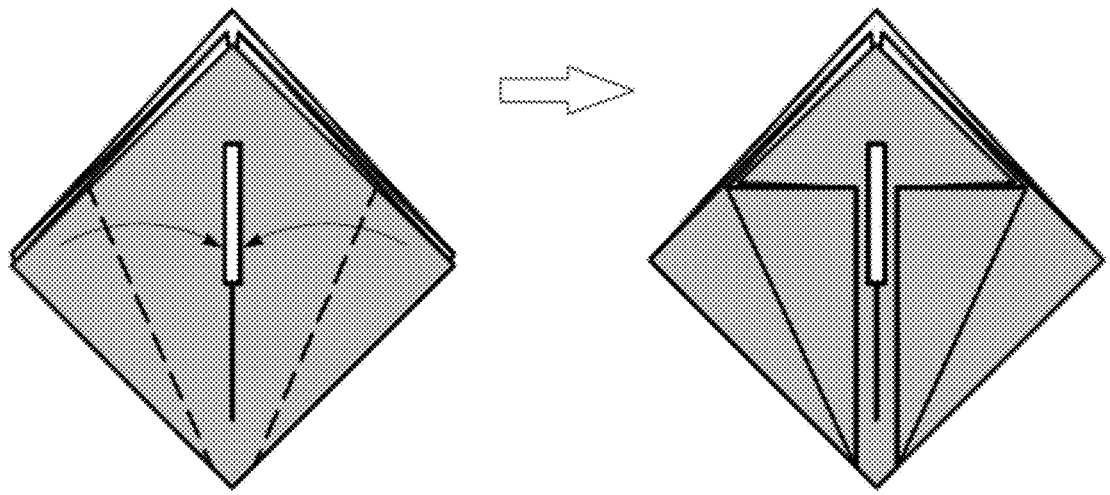
FIGURE N°6.6
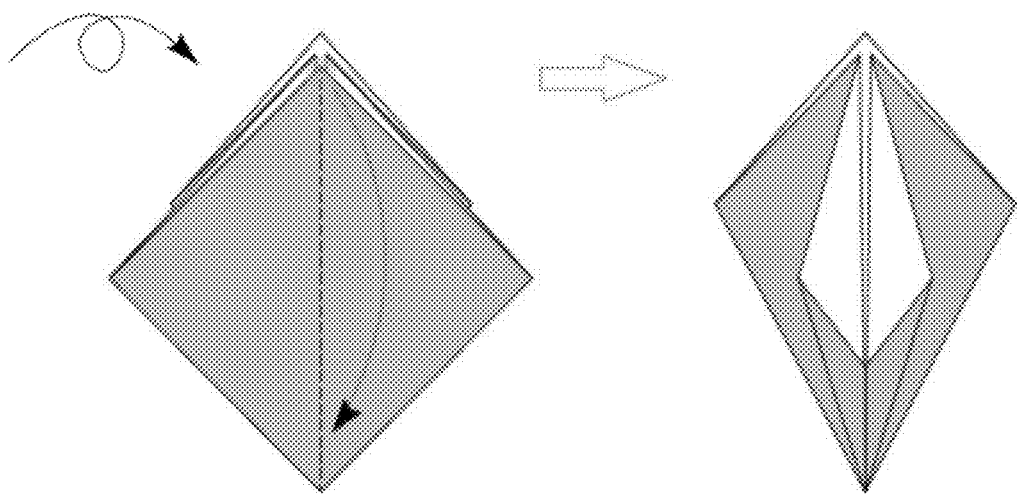

FIGURE N°6.7
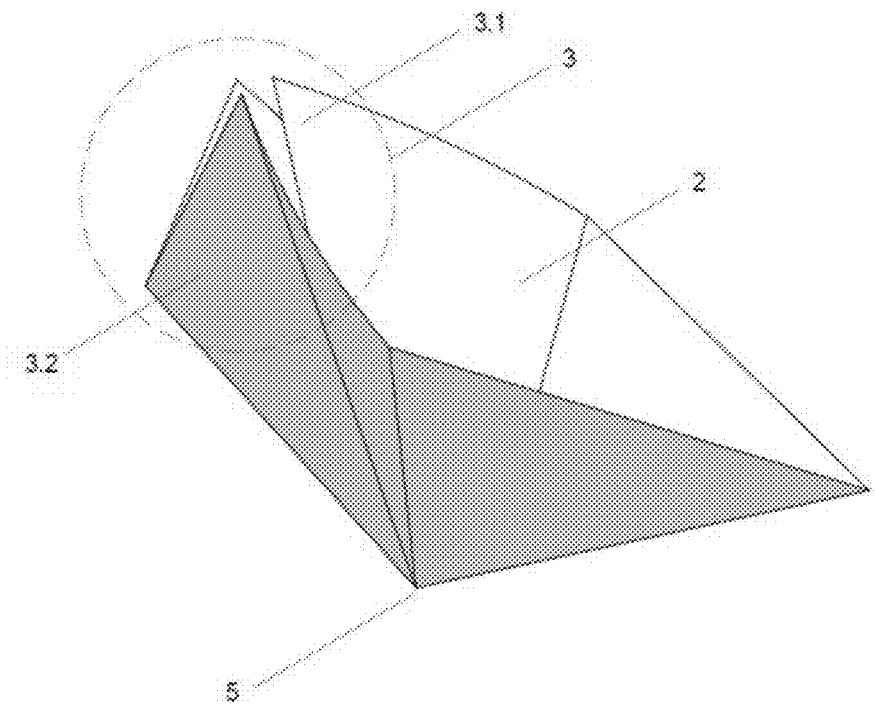
FIGURE N°7
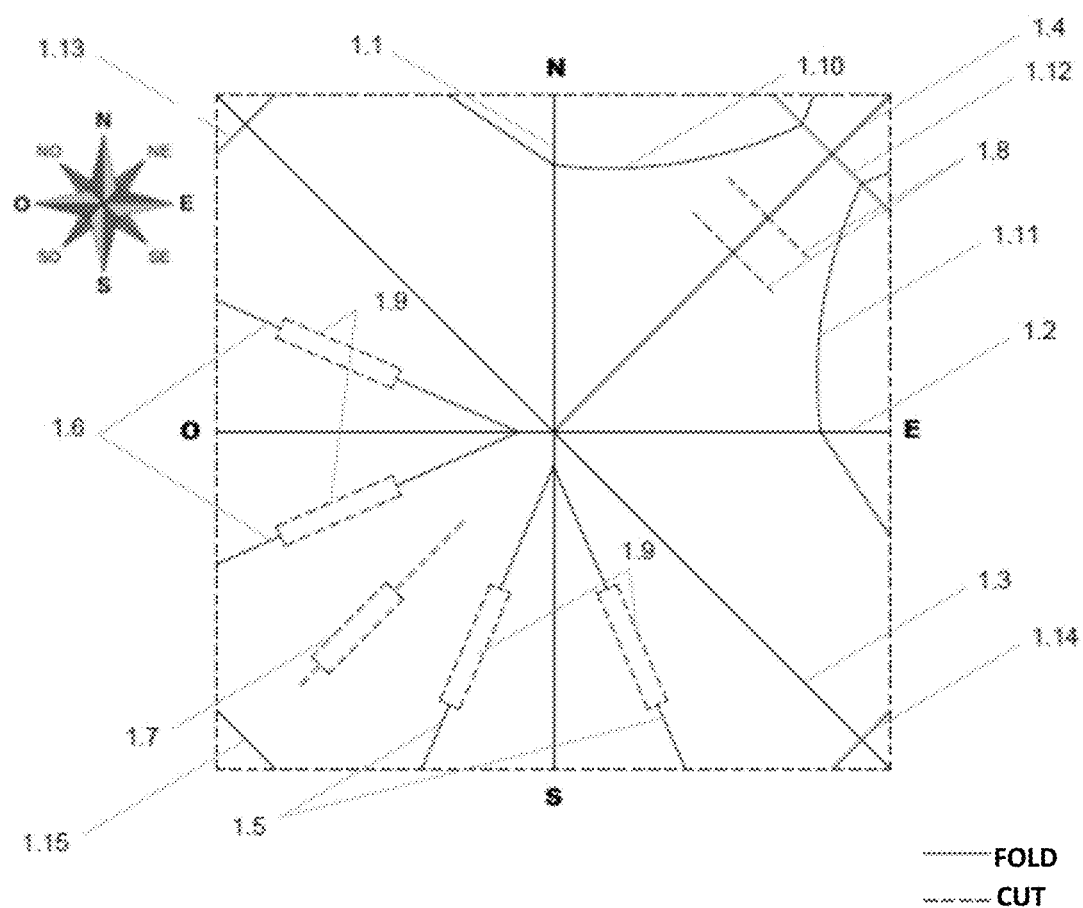
......... FOLD
------ CUT

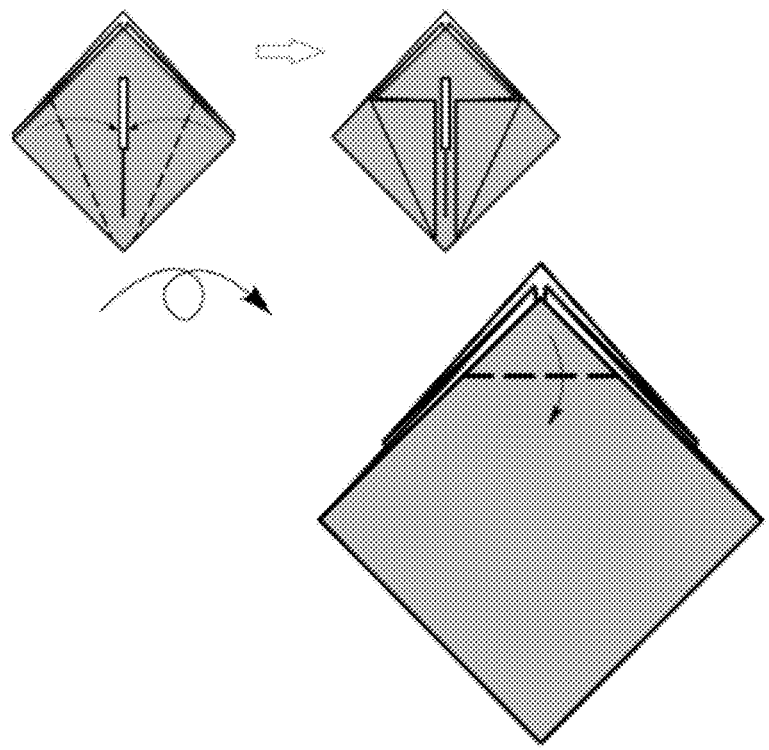
FIGURE N°8.1
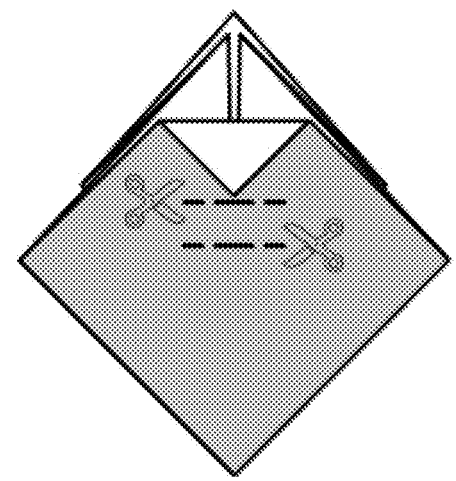
FIGURE N°8.2

FIGURE N°8.3
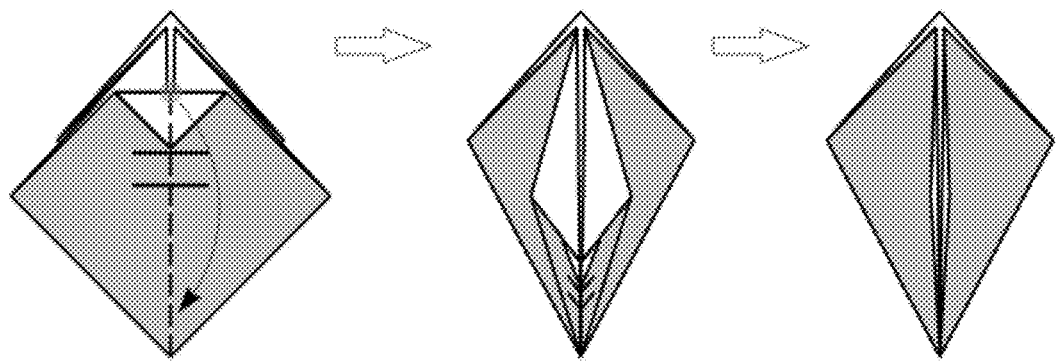
FIGURE N°8.4
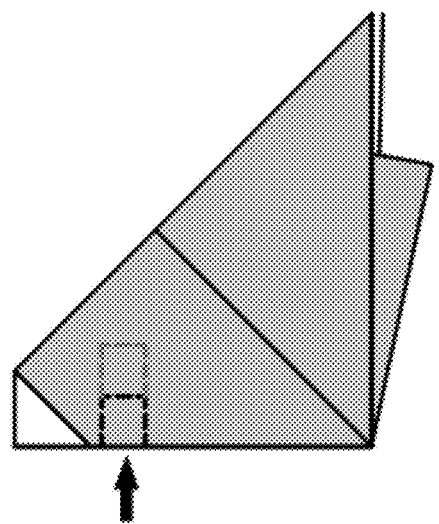
FIGURE N°8.5
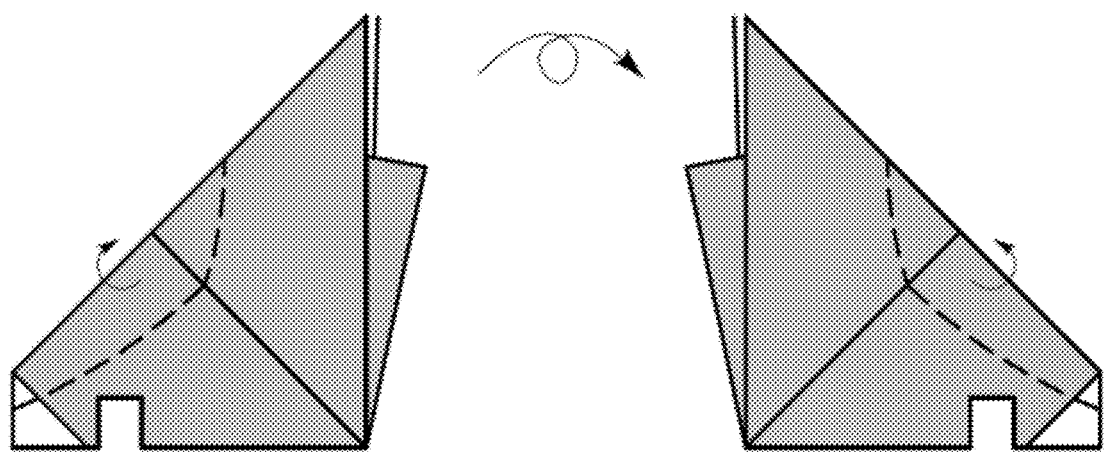

FIGURE N°8.6
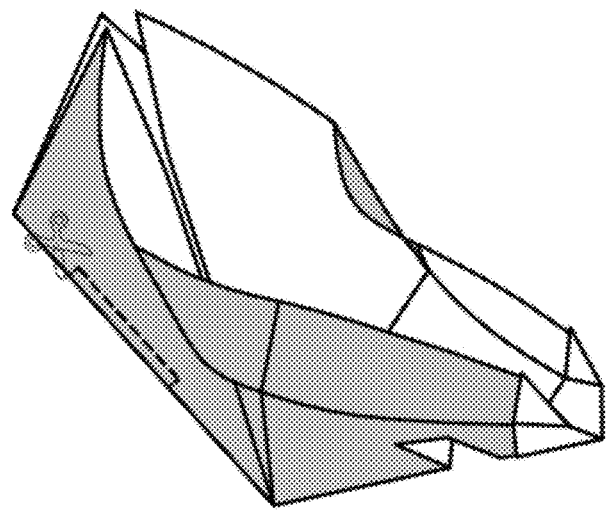
FIGURE N°8.7
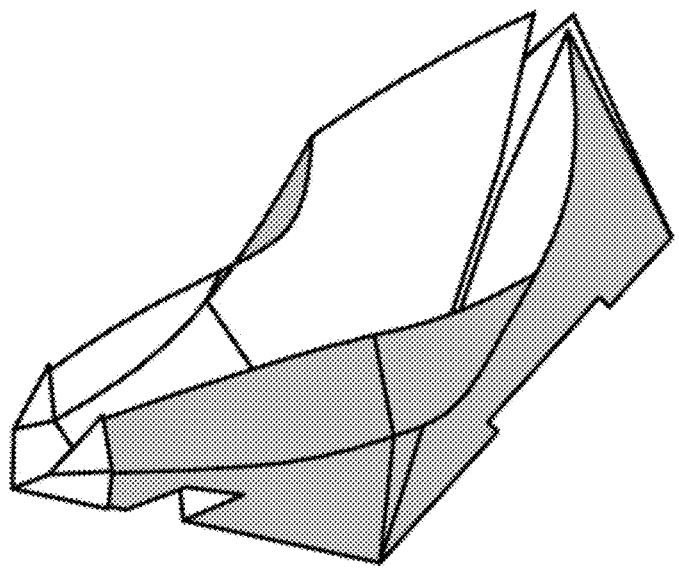

FIGURE N°9
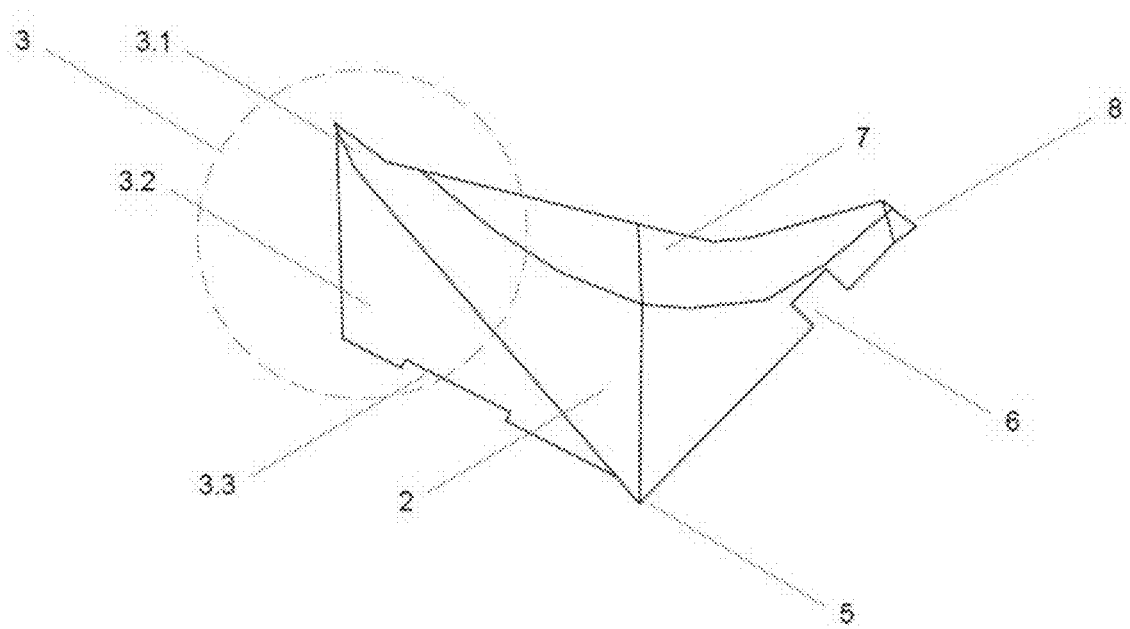
FIGURE N°10
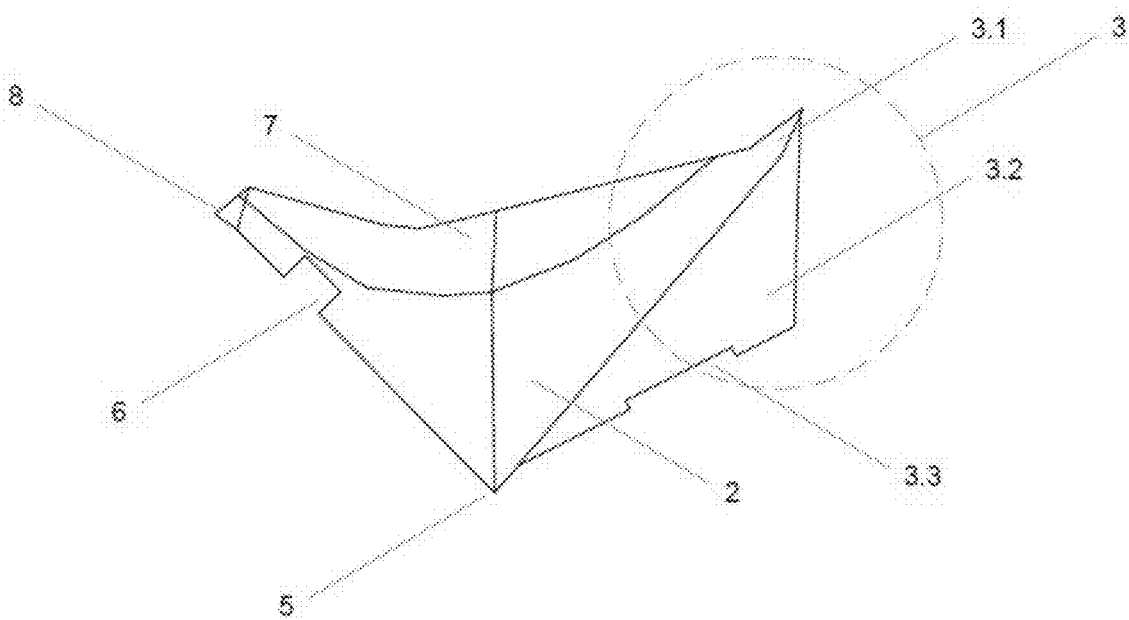

FIGURE N°11
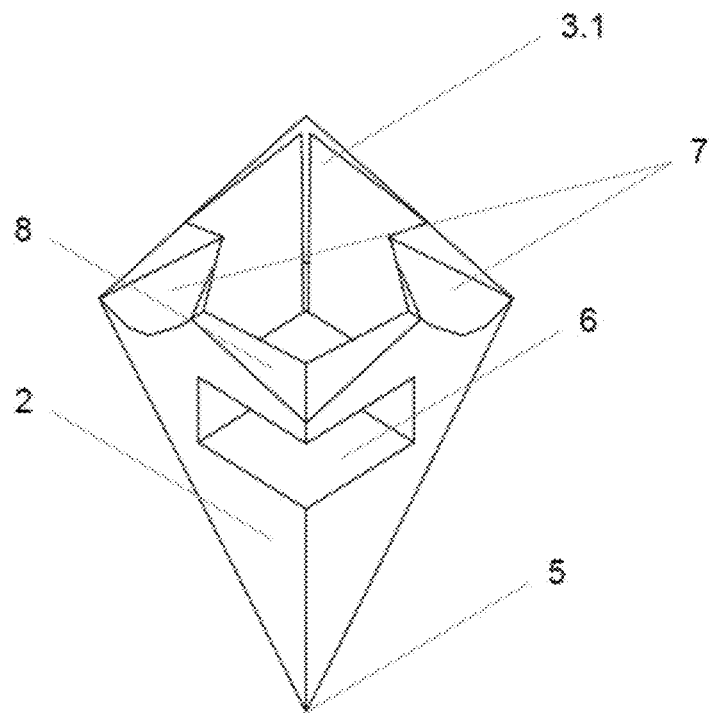
FIGURE N°12
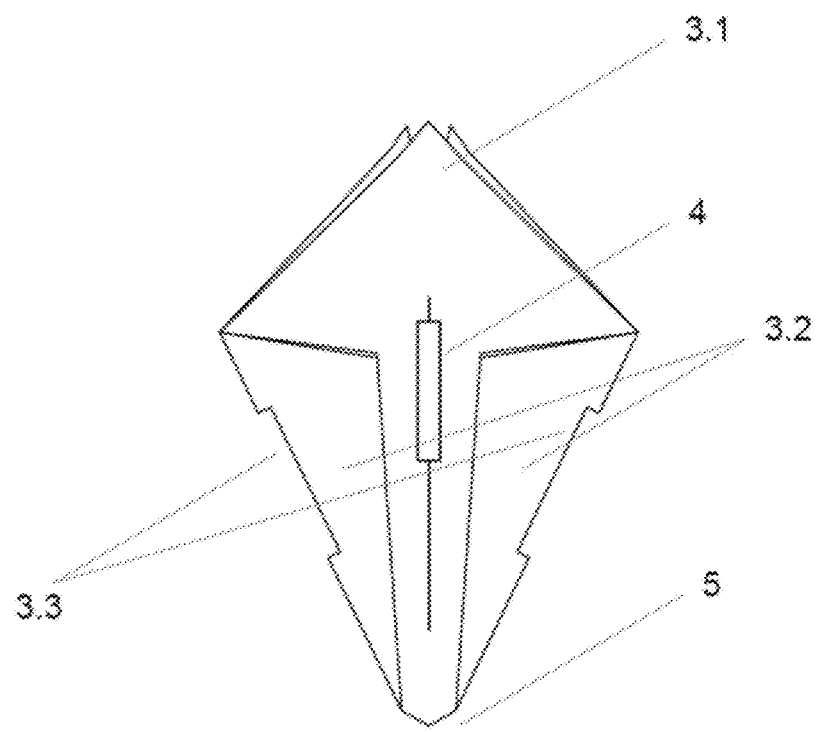

FIGURE N°13
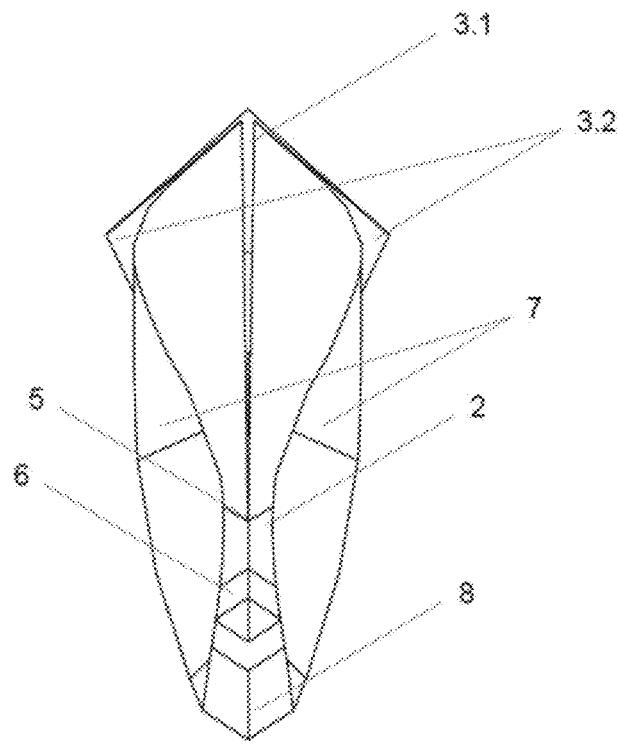
FIGURE N°14
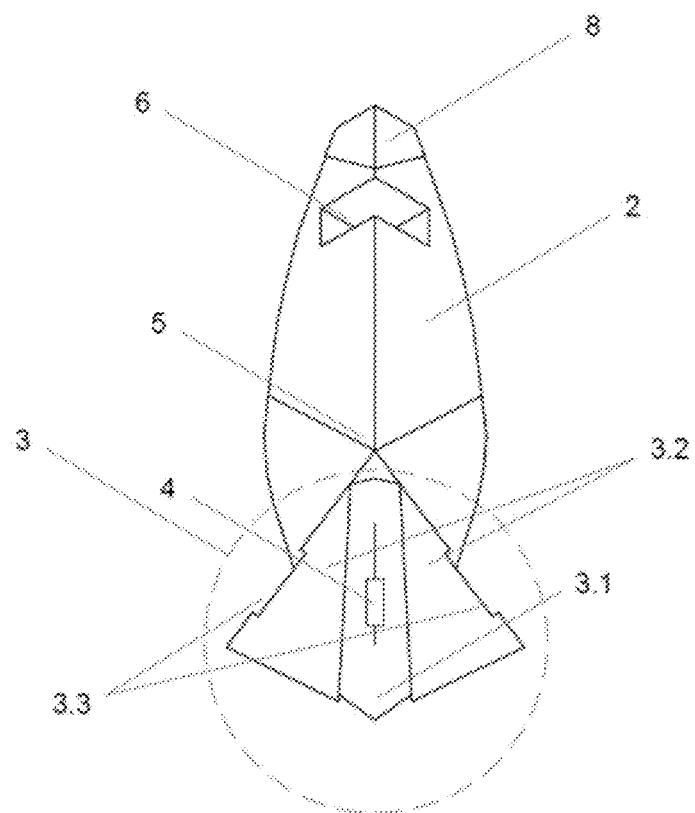

FIGURE N°15
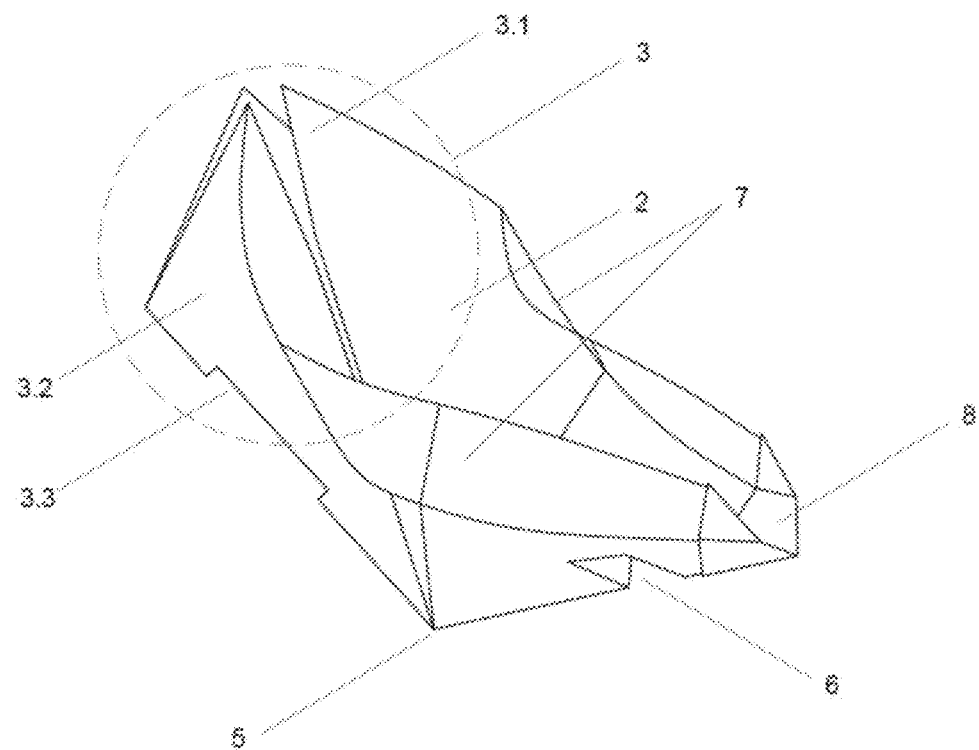

FOLDABLE POT WITH REMOVABLE HOOK FOR THE CONFIGURATION OF VERTICAL GARDENS

I. TECHNICAL FIELD

This invention is within the technical sector of gardening articles, specifically vertical gardening as decoration and self-sustainability, but also related to advertising and art.

II. STATE OF THE ART

There are currently numerous options for vertical gardening systems. Among the best known are the modular plastic plant pots and plastic and/or porous blankets with pockets. In all cases, they all have a sharply conical reservoir to house the substrate (prepared soil) where the root of the plant will develop. In addition, they all have a drip or drop irrigation system and have drainage holes to let the water run into the lower plant pots or pockets.

However, the differences are more noticeable when evaluating the wall hooking system. Blanket-type systems are hung directly on the wall without the possibility of removal or replacement. The plastic plant pots are hooked to a modular structure anchored to the wall. Some plastic plant pot products have the option to be removed from the structure, they usually house more than one plant and therefore have a significant weight.

The patent document with FILE No. 2799-2016/DIN (Hanging plant container with accelerated drop irrigation system for vertical gardens) sought to differentiate itself from the aforementioned systems by managing to house a plant in a minimum of substrate necessary for its development. This vertical gardening system could be adapted to a hydroponic irrigation system and remove weight by using an inert substrate instead of prepared soil. However, in some cases, the hooking system is not so easy when it needs to be removed or replaced. And with the weight of some plants the angle of inclination of the plant pot can be altered.

However, the aforementioned background has a number of technical disadvantages, such as:
  The weight and size of the material, which affects the means of transport to be used.
  The lack of flexibility to densify and define figures with the same plants.
  The cost and energy consumption of the manufacturing processes.
  Difficulty in handling a plant unit during installation or maintenance.

III. DESCRIPTION OF THE INVENTION

As a solution to the aforementioned problems, the present invention was developed, which consists of a plant pot manufactured on the basis of the handling of a foldable sheet through folds and cuts to contain the substrate, water and plant (root). The shape achieved allows for easy hooking and unhooking of the plant pot to a vertical structure, preferably of the mesh type, and also allows for efficient irrigation, preferably drip irrigation when vertically aligned.

This represents an improvement on the state of the art as it allows working with the plants as detachable units that can vary their location without being altered to generate different designs to the user's choice. These designs can be figures, letters, phrases, logos and any image that can be captured in frames of up to approximately 5.0 cm (vertical separation) by up to approximately 2.5 cm (horizontal separation) which achieves greater density and definition when representing the shapes.

The invention allows to obtain the minimum space that ensures the amount of substrate necessary for the subsistence of the plant, resulting in a saving of substrate, water and transport due to the low weight. In addition, it reduces the appearance of crawling insects and weeds. In the same way, the vertical garden is thinner than other systems, which is an advantage in cases where there is not much space.

The plant pots can be grouped in vertical mesh-like structures of reduced format for easy transport. Therefore, the vertical garden can be prefabricated according to the proposed design and then taken to the installation site to be placed in a shorter time and without affecting the area. This means that other activities or work can be carried out while it is being installed.

Given the option of using plant pots in a hydroponic system, different types of plants can be planted within the system, especially plants with different irrigation frequencies that will not be affected by excess water.

The plant pots allow the use of freshly rooted plants or unrooted stems or even seeds in order to root them during the adaptation process.

Their manufacture does not involve an industrial process and does not require significant energy consumption.

Similarly, transport and storage are simplified by the fact that they are square sheets prior to the folding process.

This product also enables plant propagation work to be carried out vertically. This can make more efficient use of plant nursery space.

Prior to the folding process, the foldable sheet is defined as a flat square structure comprising the following folds and cuts: north-south central fold, east-west central fold, northwest-southeast central fold, center-northeast central fold, northeast tip fold, northeast flap folds, south angular fold, west angular fold, northwest tip fold, southeast tip fold, southwest tip fold, southwest hole, northeast parallel cuts, angular holes.

When made, these folds and cuts will give shape to each of the parts of the plant pot that fulfil a function within the set, as detailed below: the conical reservoir houses the substrate and nutrients for the development of the roots. The steering spike orients the plant stem perpendicular to the plane of the garden surface. The support ring supports the plant in case it is disturbed by external agents (wind, handling, etc.). The containment flaps prevent the substrate from slipping out of the conical reservoir easily. The hooking system is a combination of three elements that help to keep the plant pot secure in the mesh and can also be removed only if done properly. The first hooking element is the upper support tail which crosses the plane of the mesh-type structure and over the upper stop of the hole through which it was inserted to prevent the plant pot from tipping forward. The second hooking element is the lower support fins whose flexible nature allows them to generate a tension towards the bottom of the hole from both sides. The third hooking element are the anchoring notches which make it difficult to remove the plant pot easily and prevent it from deforming sideways. The drainage hole allows excess water to drain away. The dripping point directs excess water to the next plant pot at the bottom.

IV. BRIEF DESCRIPTION OF THE INVENTION

FIG. 1: A view of the silhouette of the Flat Square Structure (1) showing the sides and vertices. At the top of the view of the Flat Square Structure (1), a compass rose is shown to facilitate the identification of the components.

FIG. 2: A view of the silhouette of the Flat Square Structure (1) showing the quadrants.

FIG. 3: A view of the silhouette of the Flat Square Structure (1) showing the Northern and Southern hemispheres.

FIG. 4: A view of the silhouette of the Flat Square Structure (1) showing the East and West hemispheres.

FIG. 5: A view of the Flat Square Structure (1) is shown in a state prior to the basic folding process that will be carried out in the manufacture of the product. The lines indicating the folds and cuts to be made can be seen. The outer edge is represented by a cut line (dotted line) because this structure is commonly extracted from larger sheets. There is a north-south central fold (1.1), an east-west central fold (1.2), a northwest-southeast central fold (1.3), a center-northeast central fold (1.4), two south angular folds (1.5), two west angular folds (1.6), a southwest hole (1. 7), some northeast parallel cuts (1.8), angular holes (1.9), one north flap fold (1.10), one east flap fold (1.11), one northeast tip fold (1.12), one northwest tip fold (1.13), one southeast tip fold (1.14), one southwest tip fold (1.15).

FIG. 6.1: The first step of the instructions for making the basic plant pot using the folding and cutting process is shown: a) take a square sheet and fold and unfold the two halves.

FIG. 6.2: The second step is shown: b) turn over, fold and unfold diagonally.

FIG. 6.3: The third step is shown: c) join the four ends.

FIG. 6.4: The fourth step is shown: d) fret the indicated shape on one side.

FIG. 6.5: The fifth step is shown: e) fold only the upper wings.

FIG. 6.6: The sixth step is shown: f) open the tip downwards while folding the indicated vertical axis outwards.

FIG. 6.7: The image of the finished basic plant pot is shown where the Conical Reservoir (2), the Hooking System (3), the Lower Support Tail (3.1), the Lower Support Fins (3.2) and the Dripping Point (5) can be seen.

FIG. 7: A view of the Flat Square Structure (1) is shown in a state prior to the folding process that will be carried out in the manufacture of the product. The lines indicating the folds and cuts to be made can be seen. The outer edge is represented by a cut line (dotted line) because this structure is commonly extracted from larger sheets. There is a north-south central fold (1.1), an east-west central fold (1.2), a northwest-southeast central fold (1.3), a center-northeast central fold (1.4), two south angular folds (1.5), two west angular folds (1.6), a southwest hole (1. 7), some northeast parallel cuts (1.8), angular holes (1.9), a north flap fold (1.10), an east flap fold (1.11), a northeast tip fold (1.12), a northwest tip fold (1.13), a southeast tip fold (1.14) and a southwest tip fold (1.15).

FIG. 8.1: The first step of the instructions to follow for making the complete plant pot using the folding and cutting process is shown. The process continues from step "e" (FIG. 6.5): f) turn over, fold only the upper tip downwards.

FIG. 8.2: The second step is shown: g) fret the two indicated lines.

FIG. 8.3: The third step is shown: h) open the tip downwards while folding the indicated vertical axis outwards.

FIG. 8.4: The fourth step is shown: i) profile view, push the fretwork strip inwards using the fold in reverse.

FIG. 8.5: The fifth step is shown: j) fold along the indicated line inwards on both sides while opening the fold moderately.

FIG. 8.6: The sixth step is shown: k) cut a notch on each side of the rear cone.

FIG. 8.7: The seventh step is shown: l) finished plant pot.

FIG. 9: A side view of the finished plant pot is shown after the folding process, where a Conical reservoir (2), a Hooking system (3), an Upper support tail (3.1), a Lower Support Fin (3.2), an Anchor notch (3.3), a Dripping point (5), a Support ring (6), a Containment flap (7) and a Steering spike (8).

FIG. 10: The other side view of the finished plant pot is shown after the folding process where a conical reservoir (2), a Hooking System (3), an Upper Support Tail (3.1), a Lower Support Fin (3.2), an Anchor Notch (3.3), a Dripping Point (5), a Support ring (6), a Containment Flap (7) and a Steering Spike (8).

FIG. 11: A front view of the finished plant pot is shown after the folding process where the Conical Reservoir (2), the Upper Support Tail (3.1), the Dripping Point (5), the Support Ring (6), the Containment Flaps (7) and the Steering Spike (8).

FIG. 12: A rear view of the finished plant pot is shown after the folding process, where the Hooking System (3), the Upper Support Tail (3.1), the Lower Support Fins (3.2), the Anchor Notches (3.3), a Drainage Hole (4) and the Dripping Point (5).

FIG. 13: A top view of the finished plant pot is shown after the folding process where the Conical Reservoir (2), the Upper Support Tail (3.1), the Lower Support Fins (3.2), the Dripping Point (5), the Support Ring (6), the Containment Flaps (7) and the Steering Spike (8) can be seen.

FIG. 14: A lower view of the finished plant pot is shown after the folding process where the Conical Reservoir (2), the Hooking System (3), the Upper Support Tail (3.1), the Lower Support Fins (3.2), the Anchor Notches (3.3), the Drainage Hole (4), the Dripping Point (5), the Support ring (6) and the Steering Spike (8).

FIG. 15: A perspective view of the finished plant pot is shown after the folding process where the Conical Reservoir (2), the Hooking System (3), the Upper Support Tail (3.1), the Lower Support Fins (3.2), the Anchor Notches (3.3), the Dripping point (5), the Support Ring (6), the Containment Flaps (7) and the Steering Spike (8).

The numerical references used in the figures are:
1. Flat square structure
1.1 North-south central fold
1.2 East-west central fold
1.3 Northwest-southeast central fold
1.4 Center-northeast central fold
1.5 South angular folds
1.6 West angular folds
1.7 Southwest hole
1.8 Northeast parallel cuts
1.9 Angular holes
1.10 North flap fold
1.11 East flap fold
1.12 Northeast tip fold
1.13 Northwest tip fold
1.14 Southeast tip fold
1.15 Southwest tip fold
2. Conical reservoir
3. Hooking system
3.1 Upper support tail
3.2 Lower support fins
3.3 Anchor notches 4. Drainage hole
5. Dripping point
6. Support ring
7. Containment flaps
8. Steering spike

V. PREFERRED EMBODIMENT OF THE INVENTION

The plant pot is constructed on the basis of a Flat Square Structure (1), comprising folds and cuts. Orienting each side of the Flat Square Structure (1) towards each of the four cardinal points, the Folds are defined as follows: North-South Central Fold (1.1), East-West Central Fold (1.2), Northwest-Southeast Central Fold (1.3), Center-Northeast Central Fold (1.4), South Angular Folds (1.5), West Angular Folds (1. 6), North Flap Fold (1.10), East Flap Fold (1.11), Northeast Tip Fold (1.12), Northwest Tip Fold (1.13), Southeast Tip Fold (1.14), Southwest Tip Fold (1.15). The cuts are defined as follows: Southwest Hole (1.7), Northeast Parallel Cuts (1.8) and Angular Cuts (1.9).

The plant pot obtained after making the folds and cuts has a Conical Reservoir (2) with the tip facing downwards, which is used to store the substrate and favor rooting. It allows to place the substrate (soil or similar) necessary for the development of the plant's roots and to retain the water that would be periodically poured in. On the front part of the Conical Reservoir (2), which ends in a tip, there is the steering spike (8) for aligning the stem. It ends in a "U" shape to allow the stem to settle and maintain its direction towards the front of the container. Underneath the steering spike (8) there is a slit in the material formed by the northeast parallel cuts (1.10) which allow a strip to be folded backwards and shape the support ring (6) which prevents the stem from moving, especially during the first few days of planting. The lateral folds that have been made in the Steering spike (8) to give the "U" shape extend close and almost parallel to both upper edges of the conical reservoir (2) to form the containment flaps (7) that generate partially an upper closure to the reservoir to prevent the substrate from escaping easily and to retain part of the evaporation of the water contained in it. They also provide rigidity to the shape of the reservoir. At the back of the conical reservoir (2) there is a hooking system (3) made up of three elements. The first is the upper support tail (3.1) made up of three of the four ends of the flat square structure (1) that come from radial folds formed almost from the central point of the aforementioned structure. This tail passes through the designated hole in the vertical structure, preferably of the mesh type, and over the top stop to prevent the plant pot from tipping forward. The second element is the lower support fins (3.2) which also pass through the hole in the vertical structure and are supported at the bottom. The outstanding feature of these fins is that they are formed by folds that give the material a flexible and retractable behavior to remain tensioned once it enters the designated hole. The third element is the anchor notches (3.3) located in each lower support fin (3.2) that take advantage of the flexible and retractable behavior to snap into the edges of the vertical structure and prevent the plant pot from moving easily. In the same way, the flexible and retractable behavior of the material is used when the plant pot is to be unhooked. Of these three elements, the lower support fins (3.2) fulfil the second function of protecting and channeling the irrigation water that arrives from the conical reservoir (2) through a drainage hole (4) located at the back of the reservoir. The irrigation water will end up being directed to the Dripping Point (5) to then drain from the plant pot vertically to the one underneath.

When working with the product, in order to create a design defined by different types of plants (leaf colors and sizes), it is necessary to place the plant pots on the vertical structure, preferably of the mesh type, according to the drawing divided into the same number of sections as the mesh. In this way, we will obtain the same shapes that were drawn and they will be differentiated thanks to the different types of plants that can provide the best contrast. With the passage of time, the growth of the plants should be controlled so that they do not deform the figure represented. Pruning the plants will not affect the proposed plant pot. In case it is necessary to change a plant, it can be removed from the frame through the same plant pot without any effort and without leaving any residues. The new plant will be placed in the same conditions. Finally, in case you want to change the design, all plants can be relocated by repeating the aforementioned plant change process.

To insert the plant into the plant pot, the plant should be placed with the root in the center of the substrate reservoir and filled with additional substrate, preferably in a moist state. If the plant does not have a developed root, it is placed in the same way with the lower end of the stem in the center of the conical reservoir (2) filled with substrate so that it can develop a root within a week. In both cases, care should be taken to ensure that the stem passes through the Support Ring (6) to ensure that the plant does not move or fall over. In the event that the roots do not pass through the aforementioned ring, they can be secured by their volume and weight, which will be secured in the middle of the substrate and by the containment flaps (7). If further reinforcement is required (succulent plants with heavy, fleshy leaves), the Support ring (6) can be cut at one end to create a hook to be placed above the stem.

To insert a plant pot into the mesh, take the plant pot from the bottom where the lower support fins (3.2) are located and hold it by placing the index finger and thumb on each of them, pointing the tail towards the designated hole of the vertical mesh-type structure where it is to be placed. The Upper Support Tail (3.1) is first passed through the hole by leaning slightly forward and then the Lower Support Fins (3.2) are inserted by applying a little pressure with the aforementioned fingers to reduce their width so that the fins can pass through the hole until it reaches the height of the Anchor Notches (3.3) located in each side of the fin. Once this is reached, pressure is released and this regression of the material will serve to fit the notch into the vertical structure and keep the hooking secured. To remove the plant pot from the vertical mesh-type structure, the same pressure is exerted by grasping the plant pot with the same fingers until the anchor notches (3.3) have been released and the plant pot can be rotated upwards until the lower support fins (3.2) have come out and then pulled to the front to release the upper support tail (3.1).

The irrigation system would not be affected by changes in the location of the plants as it only has one irrigation line at the top. As long as the plants remain in vertical rows, the irrigation will continue to work correctly. A dripper from the horizontally arranged watering hose is placed in the top plant pot of the row. This will receive the water at a flow rate of preferably 2 liters per hour, which will fill the container up to the height of the Drainage Hole (4) and then overflow and reach the dripping point where it will drain vertically towards the plant pot located underneath. In this way all the contained substrate will be moistened and the roots will be nourished.

In the presence of pests, fumigation is a necessary resource and the advantage of the small size of the plant pot optimizes the work. If necessary, the plant can be removed and placed upside down to immerse the leaves in soapy water or any other composition that helps to remove the presence of pests. It can then be returned to its place.

If a plant pot containing a diseased plant is to be reused, the plant pot can be unfolded and washed with the necessary compounds to remove any risky residues (viruses or bacteria). It can then be folded up again to place the new plant.

To facilitate said work, a flexible plastic material is preferably used in the manufacture of the plant pots.

Description of Folds and Cuts:

Prior to the folding process, the foldable sheet is defined as a flat square structure (1) comprising folds and cuts which will be detailed below. Orienting the sides of the structure to the four cardinal points, said foldable flat square structure (1) comprises:

- A north-south central fold (1.1) formed by a vertical line dividing the flat square structure into two similar parts. It folds upwards.
- An east-west central fold (1.2) formed by a horizontal line dividing the flat square structure into two similar parts. It folds upwards.
- A northwest-southeast central fold (1.3) formed by a diagonal line joining the northwest and southeast vertices and dividing the flat square structure into two similar triangles. It folds downwards.
- A center-northeast central fold (1.4) formed by a diagonal line joining the central point of the flat square structure with the northeast vertex. It folds upwards.
- Two southern angular folds (1.5) formed by a line in the southern hemisphere composed of three points. The first point is located in the southern side at approximately one-sixth of its overall dimension from the central point. The second point is located in the north-south central fold (1.1) at approximately one-twentieth of the central point. The third point is located in the south side and is equidistant from the first from the central point. The first section folds upwards and the other folds downwards.
- Two west angular folds (1.6) similar to the south angular folds (1.5) facing west.
- A Southwest hole (1.7) formed by a diagonal line oriented on the axis formed between the southwest vertex and the center of the structure. The ends of the line are slightly away from the above points. In the middle of this line is located at least one geometric perforation of a width preferably between three and five millimeters. The ends of the perforation do not coincide with the end points of the line.
- Some northeast parallel cuts (1.8) formed by two parallel lines perpendicular to the center-northeast central fold (1.4) where the intersection point of the first line is located at approximately one third of the overall dimension of the center-northeast central fold from the northeast vertex. The second line is at approximately one-fifth of the overall dimension of said fold from the first line. Both lines extend to the sides at approximately one fifth of the overall dimension of said fold.
- Some angular holes (1.9) formed by four geometric shapes aligned in each of the sections of the south angular folds (1.5) and west angular folds (1.6). The point where the shape begins is located at approximately one-fifth of the overall dimension of the section from the end of the structure. The point where it ends at approximately three-fifths of the overall dimension of the section from the same end. The width of the rectangle is preferably three to five millimeters.
- A north flap fold (1.10) formed by a sharply curved line composed of four points. The first point is located in the north side at approximately one eighth of its overall dimension from the northeast vertex. The second point is located at the northeast tip fold (1.12) at approximately one quarter of its overall dimension from the north side. The third point is located in the north-south central fold (1.1) at approximately one tenth of its overall dimension from the north side. The fourth point is located in the north side at approximately six-tenths of its overall dimension from the northeast vertex. It folds upwards.
- An east flap fold (1.11) formed by a line similar to the north flap fold (1.10) oriented to the east side.
- A northeast tip fold (1.12) formed by a line perpendicular to the center-northeast central fold located at approximately one fifth of the overall distance of the latter from the northeast vertex. It gets to the ends of the structure and folds downwards.
- A northwest tip fold (1.13) formed by a line perpendicular to the northwest-southeast central fold (1.3) whose point of intersection is located at approximately one-sixteenth of the overall dimension of the northwest-southeast central fold from the northwest vertex. It gets to the ends and one section folds upwards and the other folds downwards.
- A southeast tip fold (1.14) formed by a line similar to the northwest tip fold (1.13) oriented towards the southeast vertex.
- A southwest tip fold (1.15) formed by a line similar to the northwest tip fold (1.13) oriented towards the southwest vertex. It folds upwards.

Components Generated by the Folds and Cuts:

Once the folds and cuts have been made, they form a component of the foldable plant pot described below:

- The conical reservoir (2) is made up of the folds: north-south central fold (1.1), east-west central fold (1.2), northwest-southeast central fold (1.3), center-northeast central fold (1.4).
- The Upper Support Tail (3.1) is formed by the folds: Northwest Tip Fold (1.13), Southeast Tip Fold (1.14) and Southwest Tip Fold (1.15).
- The Lower Support Fins (3.2) are formed by the folds: North-South Central Fold (1.1), East-West Central Fold (1.2), South Angular Folds (1.5) and West Angular Folds (1.6).
- The anchor notches (3.3) are formed by the Holes (1.14).
- The Drainage hole (4) is formed by the southwest hole (1.7).
- The Dripping Point (5) is formed by the Folds: North-South Central Fold (1.1), East-West Central Fold (1.2), Northwest-Southeast Central Fold (1.3), Center-Northeast Central Fold (1.4).
- The Support Ring (6) is formed by the northeast parallel cuts (1.8).
- The Containment Flaps (7) are formed by the folds: North Flap Fold (1.10) and East Flap Fold (1.11).
- The Steering Spike (8) is formed by the folds: Center-northeast central fold (1.4) and Northeast tip fold (1.12).

The invention claimed is:

1. A foldable flat square structure (1) configured to be used as a plant pot for vertical gardens, the foldable flat square structure comprising:
   a north-south central fold (1.1) dividing the flat square structure in an eastern hemisphere and a western hemisphere;
   an east-west central fold (1.2) dividing the flat square structure in a northern hemisphere and a southern hemisphere;
   a northwest-southeast central fold (1.3) formed by a diagonal line joining northwest and southeast vertexes of the flat square structure;
   a center-northeast central fold (1.4) formed by a diagonal line joining a central point of the flat square structure (1) with a northeast vertex of the flat square structure;
   two southern angular folds (1.5) symmetrical with respect to the north-south central fold (1.1) and being located in the southern hemisphere of the flat square structure (1);
   two west angular folds (1.6) symmetrical with respect to the east-west central fold (1.1) and being located in the western hemisphere of the flat square structure (1); and
   a southwest hole (1.7) formed with at least one perforation located in a south-west quadrant of the flat square structure (1).

2. The flat square structure according to claim 1 characterized by being symmetric between a northeast-southwest vertex axis.

3. The flat square structure according to claim 1, further comprising two northeast parallel cuts (1.8) formed by two parallel lines perpendicular to the center-northeast central fold (1.4) located in a northeast quadrant of the flat square structure.

4. The flat square structure according to claim 1, further comprising angular holes (1.9) located in each of the south angular folds (1.5) and the west angular folds (1.6).

5. The flat square structure according to claim 1, further comprising a north flap fold (1.10) formed by a curved line starting and ending on the northern hemisphere of the flat square structure (1).

6. The flat square structure according to claim 1, further comprising a northeast tip fold (1.12) formed by a line perpendicular to the center-northeast central fold (1.4) located at the northeast vertex.

7. The flat square structure according to claim 5, wherein the north flap fold (1.10) intersects the north-south central fold (1.1) and a northeast tip fold (1.12) formed by a line perpendicular to the center-northeast central fold (1.4) located at the northeast vertex so that said northeast tip fold (1.12) is divided into three sections.

8. The flat square structure according to claim 1, wherein the southern angular folds (1.5) comprise two sections whose meeting point is away from the central point of the flat square structure (1).

9. The flat square structure according to claim 1, wherein the southwest hole (1.7) does not coincide with the center of the flat square structure (1).

10. The flat square structure according to claim 1, further comprising a northwest tip fold (1.13) formed by a line perpendicular to the northwest-southeast central fold (1.3) located at the northwest vertex, a southeast tip fold (1.14) formed by a line perpendicular to the northwest-southeast central fold (1.3) located at the southeast vertex, and a southwest tip fold (1.15) parallel to the northwest-southeast central fold (1.3) located at the southwest vertex.

11. The flat square structure according to claim 1, further comprising an east flap fold (1.11) formed by a curved line starting and ending on an eastern hemisphere of the flat square structure (1).

12. A plant pot configured to be used in vertical gardens, the plant pot comprising:
    a foldable flat square structure having:
      a north-south central fold (1.1) dividing the flat square structure in an eastern hemisphere and a western hemisphere;
      an east-west central fold (1.2) dividing the flat square structure in a northern hemisphere and a southern hemisphere;
      a northwest-southeast central fold (1.3) formed by a diagonal line joining northwest and southeast vertexes of the flat square structure;
      a center-northeast central fold (1.4) formed by a diagonal line joining a central point of the flat square structure (1) with a northeast vertex of the flat square structure;
      two southern angular folds (1.5) symmetrical with respect to the north-south central fold (1.1) and being located in the southern hemisphere of the flat square structure (1);
      two west angular folds (1.6) symmetrical with respect to the east-west central fold (1.1) and being located in the western hemisphere of the flat square structure (1); and
      a southwest hole (1.7) formed with at least one perforation located in a south-west quadrant of the flat square structure (1).

13. The plant pot according to claim 12, wherein a conical reservoir (2) of the plant pot is formed by the north-south central fold (1.1), the east-west central fold (1.2), the northwest-southeast central fold (1.3), and the center-northeast central fold (1.4).

14. The plant pot according to claim 12, wherein said flat square structure further comprises a northwest tip fold (1.13) formed by a line perpendicular to the northwest-southeast central fold (1.3) located at the northwest vertex, a southeast tip fold (1.14) formed by a line perpendicular to the northwest-southeast central fold (1.3) located at the southeast vertex, and a southwest tip fold (1.15) parallel to the northwest-southeast central fold (1.3) located at a southwest vertex, so that an upper support tail (3.1) of the plant pot is formed by said northwest tip fold (1.13), said southeast tip fold (1.14) and said southwest tip fold (1.15) and lower support fins (3.2) of the plant pot are formed by said north-south central fold (1.1), said east-west central fold (1.2), said southern angular folds (1.5) and said west angular folds (1.6).

15. The plant pot according to claim 12, wherein said flat square structure further comprises angular holes (1.9) located in each of the southern angular folds (1.5) and the west angular folds (1.6), wherein anchor notches (3.3) of the plant pot are formed by the angular holes (1.9).

16. The plant pot according to claim 12, wherein a drainage hole (4) of the plant pot is formed by the southwest hole (1.7) and a dripping point (5) of the plant pot is formed by the north-south central fold (1.1), the east-west central fold (1.2), the northwest-southeast central fold (1.3), and the center-northeast central fold (1.4).

17. The plant pot according to claim 12, wherein said flat square structure further comprises two northeast parallel cuts (1.8) formed by two parallel lines perpendicular to the center-northeast central fold (1.4) located in a northeast quadrant of the flat square structure, so that a support ring (6) of the plant pot is formed by the northeast parallel cuts (1.8).

18. The plant pot according to claim 12, wherein said flat square structure further comprises a north flap fold (1.10) formed by a curved line starting and ending on the northern hemisphere of the flat square structure and an east flap fold (1.11) formed by a curved line starting and ending on the eastern hemisphere of the flat square structure, wherein containment flaps (7) of the plant pot are formed by said north flap fold (1.10) and said east flap fold (1.11).

19. The plant pot according to claim 12, wherein said flat square structure further comprises a northeast tip fold (1.12) formed by a line perpendicular to the center-northeast central fold (1.4) located at the northeast vertex, so that a steering spike (8) of the plant pot is formed by the center-northeast central fold (1.4) and the northeast tip fold (1.12).

* * * * *